Aug. 16, 1966   R. KREMP ETAL   3,266,395
FILM CONTAINER AND CAMERA FOR RECEIVING THE SAME
Filed Oct. 21, 1964
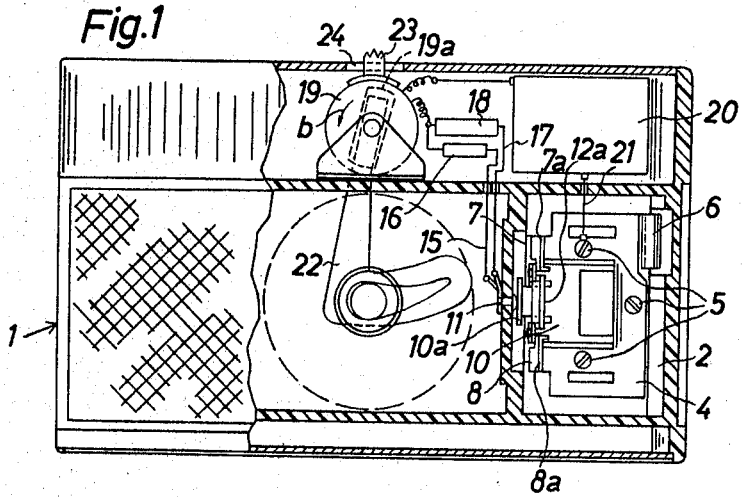
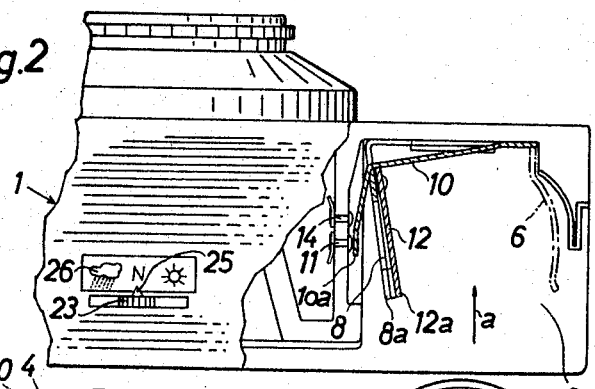
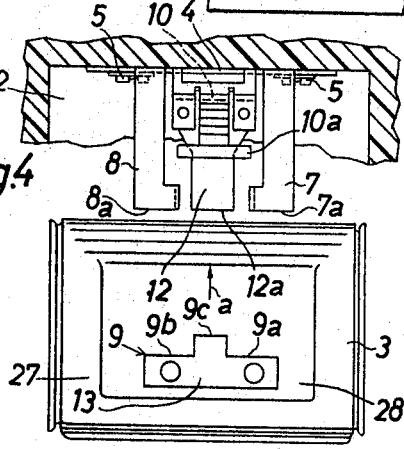
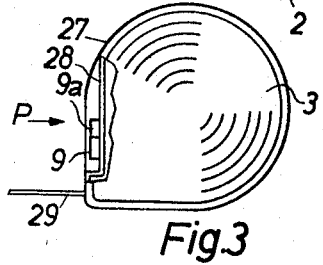
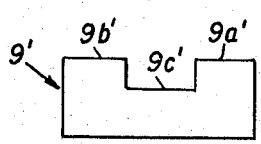
*INVENTOR.*
RUDOLF KREMP
WILHELM KISSELMANN
BY ALFRED WINKLER
DIETER ENGELSMANN
RUDOLF MATTHESS
ALBERT ZANNOTH
Michael S. Striker

United States Patent Office 3,266,395
Patented August 16, 1966

3,266,395
FILM CONTAINER AND CAMERA FOR
RECEIVING THE SAME
Rudolf Kremp and Wilhelm Kisselmann, Grunwald, Munich, Alfred Winkler, Munich, Dieter Engelsmann, Unterhaching, Munich, and Rudolf Matthess and Albert Zannoth, Munich, Germany, assignors to Agfa Aktiengesellschaft, Leverkusen, Germany
Filed Oct. 21, 1964, Ser. No. 405,544
Claims priority, application Germany, Dec. 20, 1963, A 44,850; June 13, 1964, A 46,311
19 Claims. (Cl. 95—10)

The present invention relates to film containers as well as to cameras for receiving the film containers.

In particular, the present invention relates to a camera, which may be either a still camera or a motion picture camera, and which is adapted to receive a film container of the invention which carries a means which adjusts the camera automatically in accordance with the speed of the film which is in the container.

Of course, cameras of this type are well known, and the film container usually carries at its exterior a suitable stop member for actuating the camera according to the lighting conditions so as to take into account the factor of film speed. With conventional structures of this type, the film-speed adjustment member which is carried by the film container engages and moves a member of the camera which senses the film-speed indicating member so as to automatically adjust the camera according to the film speed, and it is of course essential with such structures that the member which is carried by the film container for indicating the speed of the film therein must have a very precisely determined position. In order to provide a very accurate sensing of this member which is carried by the film container by the movable member of the camera, the entire film container must be very precisely positioned at least in the direction in which the movable sensing member is displaced for sensing the film speed. This requirement necessitates at least one exterior surface at the film container and a further surface at the camera engaging this latter exterior surface of the container.

With structures of this type it is necessary that when the container is introduced into the camera it actuates the camera structure for introducing the factor of film speed, and the manufacturing tolerances involved in the manufacture of the film-speed indicating member are necessarily added to the assembly tolerances resulting from the joining of the film-speed indicating member to the container, and because of this relatively great range of tolerances it is essential that the movement of the sensing member of the camera be very large from one value of film speed to the next value thereof, or it is necessary simply to operate the camera with a certain amount of adjusting errors. Of course, the same disadvantages are present with respect to the camera structure which holds the film container and which senses the position of the film-speed indicating member carried thereby.

It is accordingly a primary object of the present invention to provide a camera and container which will avoid the above drawbacks.

Thus, an object of the invention is to provide for a film container a member which has surfaces which determine not only the setting of the camera according to the film speed but also the location of the film container in the camera.

Furthermore, it is an object of the invention to provide a film container which is very expensive but which at the same time can be situated in the camera with very great accuracy.

A further object of the present invention is to provide an exceedingly inexpensive structure for releasably holding the film container in the camera and for at the same time sensing the film-speed indicating member which is carried by the film container.

In addition, it is an object of the invention to provide for an assembly of the above type a further adjusting structure enabling the operator to adjust the camera so as to take into account factors in addition to the film speed for determining a proper exposure under particular operating conditions.

With the above objects in view the invention includes a film container which is adapted to be used in a camera of the invention and which carries at its exterior a member having at least a pair of surfaces one of which participates in the location of the film container in the camera and the other of which actuates a structure of the camera which adjusts the latter in accordance with the speed of the film which is in the container. The camera includes a camera housing which has a chamber for receiving the film container, and in this chamber is located a spring means which resiliently grips the container to hold the latter in a predetermined position in the camera housing. Part of this spring means is in the form of an elongated springy member which forms part of the structure of the camera for adjusting the latter according to the film speed, and this springy member is engaged by one of the above-mentioned surfaces of the member carried by the film container to be displaced by the latter surface to a position which places in the camera the factor of the speed of the film in the container. The structure for adjusting the camera according to the film speed includes a moving-coil instrument supported for rotary movement by the camera housing, and a manually operable means is connected to the moving coil instrument for setting the latter at a predetermined angular position for taking into account an additional factor which influences the exposure of film.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a rear view of a camera part of which is broken away to illustrate the structure of the invention;

FIG. 2 is a partly broken away top plan view of part of the camera of FIG. 1;

FIG. 3 is an end view of a film container of the invention;

FIG. 4 is a side view of the film container of FIG. 3 together with the camera structure which cooperates therewith; and FIG. 5 shows a projecting member similar to that seen in FIG. 4, except that the projecting portions are reversed.

Referring now to the drawings, the camera 1 illustrated therein has a camera housing provided with a chamber 2 for receiving the film container 3 which in the illustrated example is a film cartridge. In the case of a motion picture camera, the container 3 would be a suitable cassette. Within the chamber 2, at a portion thereof opposite from the entrance opening through which the cartridge 3 is introduced into the chamber 2, the camera housing carries a spring means 4 in the form of a member made of springy sheet metal and fixed to the camera housing by means of screws 5. The rear opening of the camera is closed in a well known manner by a rear cover which is not illustrated in detail and which can be moved between a position opening the rear of the camera and closing the camera housing.

The springy sheet metal member 4 has three projections 6, 7 and 8 each of which is provided with a right-angle bend so that these projections extending rearwardly from the part of the member 4 which is fixed by the screws 5 to the camera housing. These springy projections 6–8 form springy fingers which grip and resiliently hold the cartridge 3 in the chamber 2.

The film container 3 carries at its outer exterior a member 9 which is provided with a pair of surface portions, formed by the edges 9a and 9b, and the member 9 is situated at the exterior surface 27 of the container 3. When the container is introduced into the chamber 2 the edges 9a and 9b respectively engage the ends 7a and 8a of the projections 7 and 8. In this way each film container 3 when introduced into the camera in the direction of the arrow a must assume a predetermined position with respect to the camera housing, and the springy elements 6–8 releasably and resiliently hold the film container 3 in this predetermined position.

As is apparent particularly from FIG. 3, the exterior surface 27 is a convex outer surface of a side wall of the container 3 which is of a generally cylindrical configuration, while on one side, however the surface is formed with a depression having a flat surface 28 which is situated in a plane which is perpendicular to the plane occupied by the film 29 which issues from the container 3, this film 29 issuing from the container 3 through an elongated slot thereof which is in the region of the surface 28.

As may be seen from FIG. 4, the member 9 is of a T-shaped configuration and is carried by the flat surface portion 28 in the depression of the surface 27. The T-shaped member 9 has between its opposed ends a leg 9c which terminates in a free end which forms a means for indicating the speed of the film which is in the container 3, and this leg 9c is situated between a pair of surfaces 9a and 9b of the transverse portion 13 of the member 9, these surfaces 9a and 9b adjoining the leg 9c and being parallel to the free end thereof as well as to each other, the ends 9a and 9b being in a common plane and arranged symmetrically with respect to the leg 9c. However, under certain circumstances it is possible to eliminate one of the surfaces 9a and 9b without undesirably influencing the manner in which the location of the cartridge in the camera is determined.

As a result of mounting the member 9 on the flat surface 28, the proper positioning of the cartridge in the chamber 2 of the camera housing and the proper sensing of the end of the leg 9c is greatly facilitated. Furthermore, by arranging the member 9 within a depression, there is a considerable saving in space.

The insert or spring means 4 includes an additional springy member 10 which forms a switch member as well as a member for sensing the free end of the leg 9c, and this springy member 10 is simply struck from the material of the sheet metal member 4 while being bent at a slight angle from the member 4 into the interior of the chamber 2 with the free end of the member 10 engaging the left wall of the chamber 2, as viewed in FIG. 2. This member 10 terminates in a switch contact portion 10a which in the position illustrated in the drawings engages a stationary contact 11. Furthermore, the springy extension 10 of the member 4 is fixed with a springy plate 12 which, if desired, may be formed integrally with the member 10, and the free end portion of the member 12 terminates in an edge 12a adapted to engage the end of the leg 9c of the member 9. This leg 9c has a length corresponding to the speed of the film in the container 3, so that the free end of the leg 9c projects beyond the surfaces 9a and 9b by a distance which is indicative of the film speed.

The camera housing carries forwardly of the stationary contact 11, a second stationary contact 14, and, as is most clearly shown in FIG. 1, the contact 14 is connected by a conductor 15 to a resistor 16 while the contact 11 is connected by a conductor 17 to a second resistor 18. Both of these resistors are electrically connected to one pole of the moving coil instrument 19, which may be a galvanometer, and the other pole of this instrument is electrically connected with a photosensitive element such as, for example, the photocell 20. The photocell 20 is in turn electrically connected by a conductor 21 with the springy insert 4 which is of course connected to the contact 10, so that when the contact portion 10a of switch member 10 engages the stationary contact 11 the resistor 18 is in the circuit of the galvanometer 19, while when the contact portion 10a is displaced into engagement with the stationary contact 14, the resistor 16 is in the circuit of the galvanometer 19, and because these resistors 16 and 18 respectively have different resistances, the light-responsive structure of the camera is influenced in this way to take into account the factor of the speed of the film which is in the container 3. When the contact 11 is engaged by the contact portion 10a of member 10, the resistor 16 does not enter into the operation, while when the contact portion 10a engages the stationary contact 14, the resistor 18 has no role in the operation of camera.

The moving coil instrument 19 is provided with a moving coil 19a which in the illustrated example is fixed to the diaphragm blade 22 so that the diaphragm is automatically adjusted according to the angular position of the moving coil 19a. It is possible, however, to connect to the moving coil a pointer which can either be scanned in order to automatically set the camera in accordance with the lighting conditions or which, in a semi-automatic control arrangement, or in a camera where the light-responsive structure can be uncoupled from the camera adjusting structure, can simply be movable with respect to a stationary or movable index so as to cooperate with the latter in a known, unillustrated manner to enable the camera to be properly set so as to make a proper exposure under the prevailing lighting conditions for the particular film which is in the camera.

In the example illustrated in FIG. 1, the instrument 19 is supported for rotary movement about an axis which is parallel to the optical axis and which of course includes the axis of the instrument 19 itself. A manually operable means is provided for adjusting the angular position of the instrument 19 so as to take into account additional exposure-influencing factors, and this manually operable means is in the form of a handle 23 which is fixed to the exterior of the instrument 19 and extends to the exterior of the camera through a suitable slot 24 formed in the top wall thereof. The handle 23 is provided at the exterior of the camera with an index 25 (FIG. 2) capable of being positioned along a scale 26 which is located at the exterior of the camera on the top wall thereof adjacent to the slot 24 and which carries various symbols which indicate special operating conditions under which the exposure will be properly made when the pointer or index 25 is aligned with the particular symbol of the scale 26.

Assuming now that a film container 3 is introduced into the chamber 2 in the direction of the arrow a, then the edges 9a and 9b respectively engage the end edges 7a and 8a of the springy portions or arms 7 and 8 of the member 4, and when fully introduced the cartridge 3 is gripped by the arms 7 and 8 as well as the arm 6 so as to be releasably held in the chamber 2 in a position determined by the engagement of the edges 7a and 8a with the edges 9a and 9b, respectively. The end of the leg 9c will of course engage the end edge 12a of the arm 12 so as to displace the switch contact portion 10a of the switch member 10 rearwardly. However, if the speed of the film in the container 3 is such that the leg 9c extends beyond the surfaces 9a and 9b through a relatively short distance, then the portion 12 of the member 4 will not be moved through any substantial distance, so that the contact portion 10a remains in engagement with the stationary contact 11, and in this case it is the resistor 18 which will be connected into the circuit of the instrument 19. On the other hand, if the leg 9c is substantially longer, then when the cartridge 3 is introduced into the chamber 2 in the direction of the arrow *a*, the portion 12 of member 4 will be displaced through a substantial distance in the same direction, and as a result the switch member 10 is displaced so that its contact portion 10*a* moves away from the stationary contact 11 and into engagement with the stationary contact 14, so that now it is the resistor 16, rather than resistor 18, which will be situated in the circuit of the galvanometer 19.

Of course, the structure of the invention is not limited to an arrangement which includes only a pair of stationary contacts and a pair of resistors respectively connected thereto. It is perfectly possible to have two or more stationary contacts arranged along the path in which the contact portion 10*a* is displaced and respectively connected with three or more resistors a predetermined one of which will be automatically placed in the circuit depending upon the length of the leg 9*c*. Moreover, the contact portion 10*a* can have a configuration which will enable it to simultaneously contact a pair of stationary contacts.

In order to make an exposure under particular operating conditions, the operator can adjust the handle 23 by aligning its index 25 with one of the symbols of the scale 26. In this way the instrument 19 will be turned in the direction of the arrow *b* or in an opposite direction, and thus the angular position of the coil 19*a* together with the diaphragm blade 22 is changed.

Instead of the particular structure of the member 9 which is illustrated in FIGS. 3 and 4 of the drawing, a member 9 can be provided with rounded or spherical control surfaces, or a member 9′, as seen in FIG. 5, can be provided having surfaces 9*a*′ and 9*b*′ which project forwardly beyond an intermediate surface 9*c*′ which latter functions in the same way as the end surface of the leg 9*c*, thus, the member 9′ has a substantially U-shaped configuration. Also, the arrangement of all of the control surfaces in parallel planes is not absolutely essential and these surfaces can be inclined with respect to each other with, for example, the surfaces 9*a* and 9*b* being inclined relative to each other to provide member 9 with a configuration similar to an arrowhead. Furthermore, the member 9 can be located directly at the exterior surface 27 rather than on the flat surface 28.

Furthermore, it is possible to provide for cooperation with the leg 9*c* a sensing structure which adjusts the camera in a purely mechanical manner to take into account the factor of the film speed, such as, for example, by mechanically changing the extent to which the photosensitive member 20 is exposed to light, as by providing an adjustable cover in front of the member 20, or this adjustment may also be carried out by changing the angular position of the member 19.

It is preferred to provide a pair of stop surfaces 9*a* and 9*b* to determine the location of the film container 3 in the chamber 2, since in this way any possible tilting of the container 3 is avoided. Inasmuch as the member 4 and all of the parts connected thereto are made of sheet metal, this member 4 has an extremely inexpensive construction which is very easy to adjust, since the elements for sensing the speed of the film in the container serve also to determine the position thereof in the container, and also the entire insert 4 with all of the parts connected thereto can be very inexpensively formed as a metal stamping.

The manually operable means 23 is available to enable the camera to be adjusted to take into consideration, in a very simple manner, special conditions, after the camera is automatically set to make an exposure, such as, for example, back lighting conditions, or photographing of objects which have very little contrast.

Here again, instead of making the adjustment for these special conditions by way of changing the angular position of the instrument 19, it is possible to provide this adjustment by means of an adjustable cover for the photocell 20 or by means of a variable resistor in the electrical circuit of the instrument 19.

It will be understood that each of the elements described above, or two or more together, may also find a useful application in other types of cameras differing from the types described above.

While the invention has been illustrated and described as embodied in cameras and film containers, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera which is adapted to receive a film container and which includes a structure for adjusting the camera according to the speed of film in the container, in combination, a camera housing having a chamber for receiving a film container; spring means carried by said camera housing in said chamber for releasably holding a container therein, said container having at its exterior a member provided with a predetermined surface; and a springy projection forming part of said spring means as well as part of said structure for adjusting the camera according to the speed of film in the container, said springy projection being engaged by said surface of said member when said container is in the camera to actuate said structure for adjusting the camera according to the film speed in response to introduction of the container into the camera housing.

2. In a camera, in combination, a camera housing having a chamber for receiving a film container which carries at its exterior a member having a predetermined surface which is indicative of the speed of the film in the container; spring means carried by said camera housing in said chamber for releasably holding a container therein; light-responsive means carried by said camera housing and responding to the lighting conditions for influencing the extent to which film in the camera is exposed; a springy switch member forming part of said spring means as well as part of said light-responsive means, said springy switch member being situated in the path of movement of said surface of said member when a container is introduced into said chamber so that by engagement with said surface said switch member will be displaced to a position influencing said light-responsive means according to the speed of film in the container; and manually operable means operatively connected to said light-responsive means for adjusting the latter to take into account a further exposure-influencing factor.

3. In a camera as recited in claim 2, a resistance connected into an electrical circuit with said light-responsive means, and said switch member controlling the connection of said resistance into or out of the circuit according to the position to which said switch member is displaced by said surface of said member carried by said container.

4. In a camera as recited in claim 2, said light-responsive means including a moving-coil instrument supported for rotary movement by said camera housing and said manually operable means including a member accessible to the operator and fixed to said instrument for turning the latter to an angular position to take into account said additional factor.

5. In a camera as recited in claim 4, a scale of exposure-correcting factors situated at the exterior of the camera and cooperating with said member of said manually operable means for determining the angular position to which said instrument will be turned by the operator.

6. In an assembly for making photographs, in combination, a camera having a housing carrying an adjusting means to effect adjustments for film speed, said adjusting means including a movable switch member and a positioning member adjacent to said movable switch member; and a film container removably received in said camera, said container having an elongated mouth through which the film is adapted to pass between the interior and the exterior thereof along a path located in a predetermined plane and an exterior surface portion located substantially in a plane transverse to said predetermined plane and to said path, a member connected to said exterior surface portion of said container and including a positioning surface portion located substantially in a plane normal to said transverse plane and facing in a direction away from said predetermined plane and an actuating surface portion located also substantially in a plane normal to said transverse plane and also facing in a direction away from said predetermined plane, said switch member being located in the path of movement of said actuating surface portion to be engaged thereby to automatically make an adjustment for film speed when said container is introduced into said camera, and said positioning member being located in the path of movement of said positioning surface portion of said member to be engaged thereby when said container arrives at a predetermined position within said housing to prevent said container from moving beyond said predetermined position, the distance between said actuating surface portion of said member and said positioning surface portion of said member being indicative of the speed of the film in said container and determining the amount of movement of said switch member.

7. For use in a camera, in combination, a film container having an elongated mouth through which the film is adapted to pass between the interior and the exterior of said container along a path located in a predetermined plane, said container having an exterior surface portion located substantially in a plane transverse to said predetermined plane and to said path; projecting means located adjacent said exterior surface portion of said container and projecting outwardly therefrom, said projecting means including a positioning surface portion and an actuating surface portion spaced from said positioning surface portion, the distance between said positioning surface portion and said actuating surface portion being indicative of the speed of the film which is in said container; and means connecting said projecting means to said container in said location adjacent said exterior surface portion thereof.

8. The combination according to claim 7, said projecting means including a member which includes both said positioning surface portion and said actuating surface portion, said positioning surface portion being located substantially in a plane normal to said transverse plane and facing in a direction away from said predetermined plane and said actuating surface portion being located substantially in a plane normal to said transverse plane and also facing in a direction away from said predetermined plane.

9. The combination of claim 8 and wherein said surfaces of said member are curved.

10. The combination of claim 8 and wherein said surfaces are non-parallel.

11. The combination according to claim 8, wherein said positioning surface portion is closer to said predetermined plane than said actuating surface portion.

12. The combination according to claim 8, wherein said actuating and said positioning surface portions are located in parallel planes, said distance being measured in a direction substantially normal to said predetermined plane.

13. The combination according to claim 8, wherein said member is substantially plate-like and is mounted flatwise on said exterior surface portion of said container, said plate-like member having edge portions which constitute said positioning and said actuating surface portions.

14. The combination according to claim 8, said member including an additional positioning surface portion, said positioning surface portion and said additional positioning surface portion projecting beyond said actuating surface portion, and said actuating surface portion being situated between said positioning surface portions.

15. The combination according to claim 14, said adjusting means including light-responsive means carried by said camera housing for influencing the extent to which film is exposed therein in accordance with the lighting conditions, and light-responsive means including an electrical circuit having a plurality of separate branches which respectively carry resistances of different magnitudes, said switch member constituting part of said electrical circuit and engaged by said actuating surface portion of said member during introduction of said container into the camera so as to be displaced by said actuating surface portion to a location which connects into the circuit one of said resistors in accordance with the speed of the film in the container.

16. The combination according to claim 8, said film container having a substantially tubular wall formed with said elongated mouth, said tubular wall having in the region of said mouth a flat surface portion constituting said exterior surface portion but otherwise being convexly curved at its exterior said member being carried by said container at said flat surface portion thereof.

17. The combination of claim 16 and wherein said flat surface portion is situated in a depression at the exterior of said container.

18. The combination according to claim 8, said member having an additional positioning surface portion located substantially in a plane normal to said transverse plane and facing in a direction away from said predetermined plane, said actuating surface portion being situated between said pair of positioning surface portions and said pair of positioning surface portions extending in said direction beyond said actuating surface portion.

19. The combination according to claim 18, said member being substantially T-shaped and having a pair of opposed ends between which an intermediate leg of said member is located, said intermediate leg terminating at one end in said actuating surface portion and said pair of positioning surfaces being located on opposite sides of and adjoining said intermediate leg.

References Cited by the Examiner

UNITED STATES PATENTS

| 2,080,055 | 5/1937 | Martin | 352—72 |
|---|---|---|---|
| 2,186,611 | 1/1940 | Martin | 95—10 X |
| 2,186,613 | 1/1940 | Mihalyi. | |
| 3,025,777 | 3/1962 | Wilkenson | 95—10 |
| 3,127,822 | 4/1964 | Kiper | 95—10 |
| 3,194,133 | 4/1965 | Benson | 95—10 |

FOREIGN PATENTS

| 1,296,960 | 5/1962 | France. |
|---|---|---|
| 864,803 | 1/1953 | Germany. |

NORTON ANSHER, *Primary Examiner.*

J. F. PETERS, *Assistant Examiner.*